(12) United States Patent
Nakamura et al.

(10) Patent No.: US 11,328,442 B2
(45) Date of Patent: May 10, 2022

(54) OBJECT DETECTION SYSTEM USING TOF SENSOR

(71) Applicant: FANUC CORPORATION, Yamanashi (JP)

(72) Inventors: Minoru Nakamura, Yamanashi (JP); Yuuki Takahashi, Yamanashi (JP); Atsushi Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 57 days.

(21) Appl. No.: 17/029,037

(22) Filed: Sep. 23, 2020

(65) Prior Publication Data

US 2021/0158562 A1 May 27, 2021

(30) Foreign Application Priority Data

Nov. 25, 2019 (JP) .............................. JP2019-212636

(51) Int. Cl.
| | |
|---|---|
| *G06K 9/00* | (2022.01) |
| *G06T 7/70* | (2017.01) |
| *H04N 5/235* | (2006.01) |
| *H04N 5/225* | (2006.01) |
| *G01S 17/89* | (2020.01) |
| *G06K 9/62* | (2022.01) |

(52) U.S. Cl.
CPC ............... *G06T 7/70* (2017.01); *G01S 17/89* (2013.01); *G06K 9/6215* (2013.01); *H04N 5/2253* (2013.01); *H04N 5/2351* (2013.01); *G06T 2207/10028* (2013.01)

(58) Field of Classification Search
CPC ............ G06T 7/70; G06T 2207/10028; G06T 2200/04; G06T 2207/10024; G06T 2207/20081; G06T 2207/20084; G06T 7/74; G01S 17/89; G01S 7/4911; G01S 7/4918; G01S 17/36; G01S 17/88; G01S 17/06; G01S 17/08; G01S 17/894; G06K 9/6215; G06K 2209/19; G06K 9/00201; G06K 9/3233; H04N 5/2253; H04N 5/2351; H04N 5/2353; H04N 5/2354; H04N 5/232; B25J 19/023
USPC ..................................................... 382/103
See application file for complete search history.

(56) References Cited

FOREIGN PATENT DOCUMENTS

| | | |
|---|---|---|
| JP | H10197635 A | 7/1998 |
| JP | 201164498 A | 3/2011 |
| JP | 2012123781 A | 6/2012 |
| JP | 2013101045 A | 5/2013 |

*Primary Examiner* — Stephen P Coleman
(74) *Attorney, Agent, or Firm* — Hauptman Ham, LLP

(57) ABSTRACT

The object detection system includes a TOF sensor which outputs an image of a target space on the basis of a phase difference between reference light emitted toward the target space and reflected light from the target space, an object detection section which detects a position of an object present in the target space on the basis of the output image, an imaging conditions calculation section which calculates imaging conditions including at least one of an integration time and a light emission period of the TOF sensor on the basis of an image of the detected object, and an imaging conditions changing section which changes a configuration of the TOF sensor to the calculated imaging conditions, and the object detection section detects a position of the object on the basis of the image output under the changed imaging conditions.

14 Claims, 13 Drawing Sheets

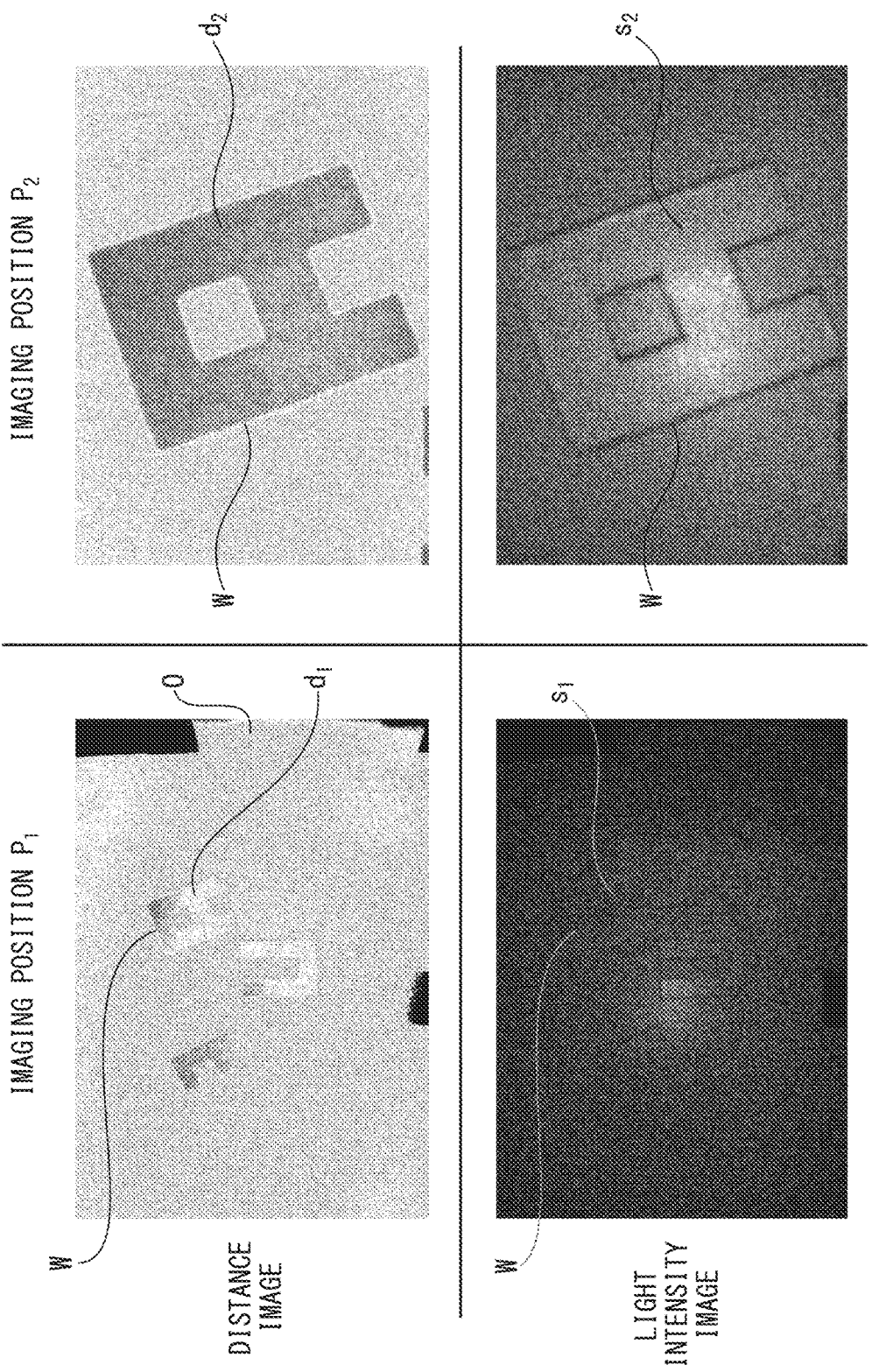

OBJECT DETECTION SYSTEM USING TOF SENSOR

RELATED APPLICATIONS

The present application claims priority to Japanese Application Number 2019-212636, filed Nov. 25, 2019, the disclosure of which is hereby incorporated by reference herein in its entirety.

BACKGROUND OF THE INVENTION

1. Field of the Invention

The present invention relates to an object detection system, and in particular, relates to an object detection system using a TOF sensor.

2. Description of the Related Art

As a distance measuring device which measures the distance to an object, TOF (time of flight) sensors which output distance on the basis of the time-of-flight of the light are known. TOF sensors often employ a phase difference method (a so-called "indirect method") in which a target space is irradiated with reference light which is intensity modulated over predetermined cycles, whereby the distance to the target space is calculated based on the phase difference between the emitted reference light and the reflected light from the target space. This phase difference is obtained from the amount of received reflected light. As prior art related to such TOF sensors, the following literature is known.

Japanese Unexamined Patent Publication (Kokai) No. 2012-123781 discloses that in order to estimate the position and posture of a target object with high accuracy while reducing the influence of noise in a distance image caused by multi-path reflection or the like, image features are detected from a two-dimensional image corresponding to the distance image, and the coordinates of the image features are calculated from the distance image.

Japanese Unexamined Patent Publication (Kokai) No. 2013-101045 describes that in order to recognize the three-dimensional position and posture of an object at a small computational cost, an area for searching for the object on a two-dimensional image acquired by a camera is set as a search condition on the basis of three-dimensional information acquired by a range sensor, two-dimensional position information of the object is acquired from the two-dimensional image within the set search condition, and three-dimensional point data used for recognizing the three-dimensional position and posture of the object is selected from three-dimensional information on the basis of the acquired two-dimensional position information.

Japanese Unexamined Patent Publication (Kokai) No. 2011-64498 describes that in the TOF method, less light reaches long-distance subjects when light is emitted toward short-distance subjects, whereby the distance measurement accuracy of the long-distance subjects decreases, and when long-distance subjects are illuminated, the amount of light reaching the short-distance subjects will increase, whereby pixel charge saturation will occur, and thus, first imaging conditions are set based on distance information, and the subject is imaged under the first imaging conditions.

Japanese Unexamined Patent Publication (Kokai) No. 10-197635 describes that in order to improve sensitivity and obtain stable distance measurement performance even in adverse environments such as rain, snow, and window contamination, environmental conditions are detected, and the light emission period of a light emitting part is changed in accordance with the detected environmental conditions to change the laser light detection time.

SUMMARY OF THE INVENTION

TOF sensors have various disadvantages caused by the distance measurement principle thereof. One disadvantage is due to the distance and reflectance of the imaging object. In general, there are variations due to the influence of shot noise in the distance measurement value of the TOF sensor, and though the variation width can be reduced by increasing the light emission amount or the like of the reference light, if the reference light is too strong, for short-distance objects or high-reflectance objects, so-called saturation or halation may occur in some cases, whereby distance measurement becomes impossible. Conversely, for long-distance objects or low-reflectance objects, the reflected light amount of the reference light may be insufficient in some cases, whereby distance measurement accuracy is reduced. Furthermore, due to the distance measurement principle of TOF sensors, which detect the phase difference between reference light and reflected light, the smaller the light emission period of the reference light (the higher the light emission frequency), the greater variation is reduced, and if the light emission period of the reference light is reduced (the light emission frequency is increased), the distance measurement range is reduced, whereby distance measurement error due to so-called "aliasing" can easily occur.

Another disadvantage of TOF sensors is attributed to the effect of multi-path (multiple reflection). For example, if there is a strongly-reflective object in the vicinity of the object, the object is irradiated with the reference light reflected by the strongly-reflective object, whereby the distance measurement value of the object may be shifted backward.

Thus, a technology for accurately detecting the position of an object using a TOF sensor is desired.

An aspect of the present disclosure provides an object detection system comprising a TOF sensor which outputs an image of a target space on the basis of a phase difference between reference light emitted toward the target space and reflected light from the target space, an object detection section which detects a position of an object present in the target space on the basis of the output image, an imaging conditions calculation section which calculates imaging conditions including at least one of an integration time and a light emission period of the TOF sensor on the basis of an image of the detected object, and an imaging conditions changing section which changes a configuration of the TOF sensor to the calculated imaging conditions, wherein the object detection section detects a position of the object on the basis of the image output under the changed imaging conditions.

Another aspect of the present disclosure provides an object detection system comprising a TOF sensor which outputs an image of a target space on the basis of a phase difference between reference light emitted toward the target space and reflected light from the target space, an object detection section which detects a position of an object present in the target space on the basis of the output image, an imaging position/posture calculation section which calculates at least an imaging position of the TOF sensor on the basis of an image of the detected object, and a movement mechanism which changes at least a position of the TOF sensor or the object to the calculated imaging position, wherein the object detection section detects a position of the object on the basis of the image output at the change imaging position.

BRIEF DESCRIPTION OF THE DRAWINGS

FIG. 10 is a view showing an example of images in which an object is captured larger before and after position changing.

DETAILED DESCRIPTION

Figure 1:
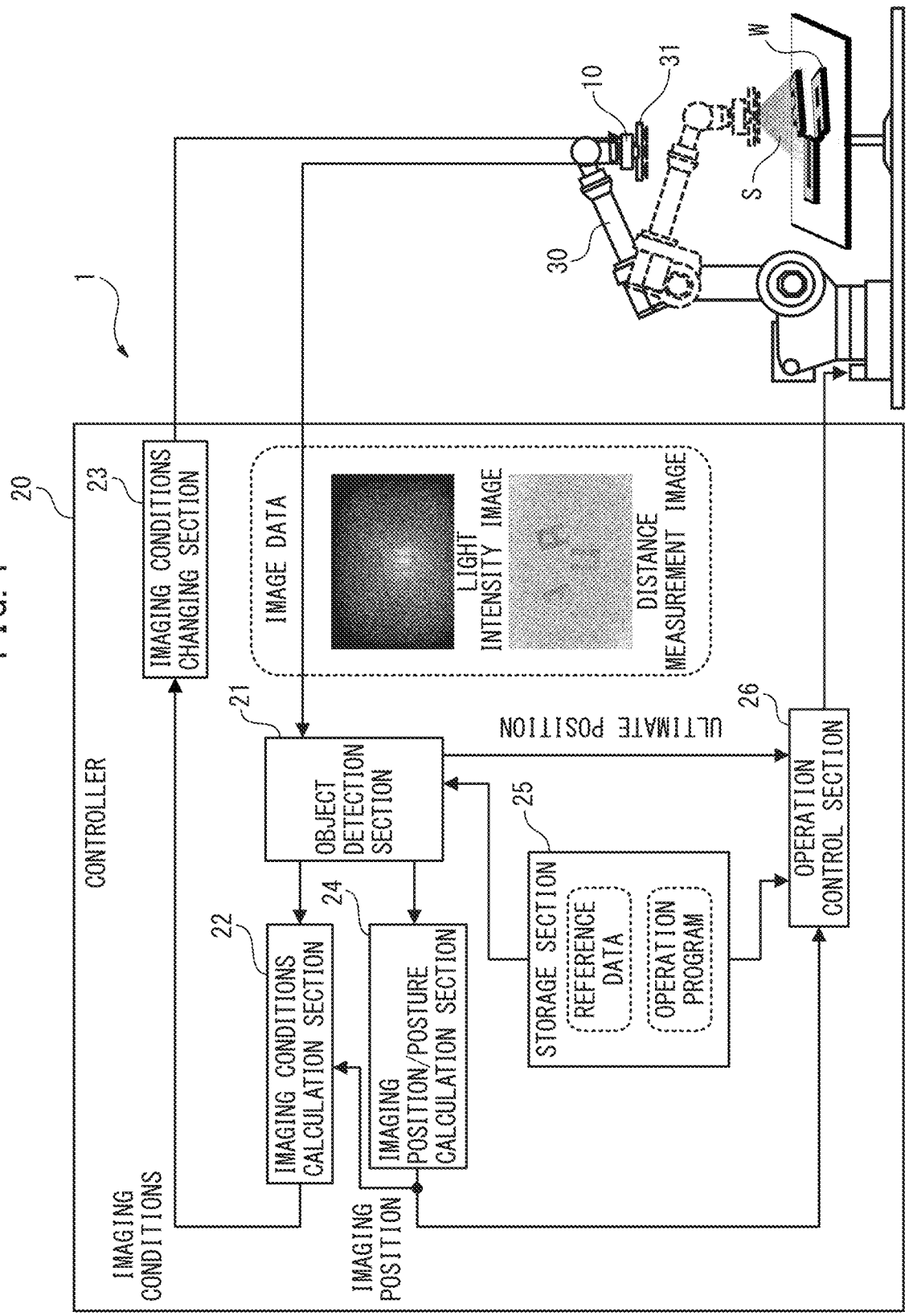
FIG. 1 is a block diagram showing the structure of an object detection system according to an embodiment.

The embodiments of the present disclosure will be described in detail below with reference to the attached drawings. In the drawings, identical or similar constituent elements are assigned the same or similar reference signs. Furthermore, the embodiments described below do not limit the technical scope of the invention or the definitions of the terms described in the claims.

FIG. 1 shows the structure of an object detection system 1 according to the present embodiment. The object detection system 1 is, for example, a robot system using a TOF sensor 10 for robot vision, and may comprise a TOF sensor 10, a controller 20 which is wired or wirelessly connected to the TOF sensor 10, and a robot 30 and a tool 31 which are controlled by the controller 20.

The TOF sensor 10 may be a TOF camera having a plurality of light emitting elements and a plurality of light receiving elements, or may be a laser scanner having one light emitting element and one light receiving element, or the like. The TOF sensor 10 is a TOF sensor which utilizes the so-called "indirect method", and outputs a distance image of a target space on the basis of the phase difference between the reference light S emitted toward the target space and the reflected light from the target space. The TOF sensor 10 may output a light intensity image of the light received from the target space. Furthermore, the distance image and the light intensity image may be gray scale images in consideration of visibility, or RGB images in which the magnitude of the numerical value is represented by the displacement of the color, or may be simply an arrangement of numerical values. For ease of understanding, in the following, all image data output from the TOF sensor 10 is simply referred to as an "image."

The controller 20 may be a classical computing device comprising a CPU (central processing unit), an FPGA (field-programmable gate array), an ASIC (application specific integrated circuit), or the like, or may be a quantum computing device comprising a quantum processor. The controller 20 is configured so as to detect the position (and, if necessary, the posture) of an object W on the basis of the image output from the TOF sensor 10, and to correct the operation of the robot 30 as a part of the movement mechanism and the operation of the tool 31 as a part of the movement mechanism, which are taught in advance, on the basis of the detected position of the object W.

The robot 30 may be an articulated robot, or may be another industrial robot such as a parallel link robot. The tool 31 may be a suction-type hand which suctions an object W, or may be a hand provided with a plurality of finger portions, or may be another tool in accordance with the operation performed on the object W. Examples of other tools include sealing tools, welding tools, screw fastening tools, soldering tools, laser machining tools, etc.

Figure 2:
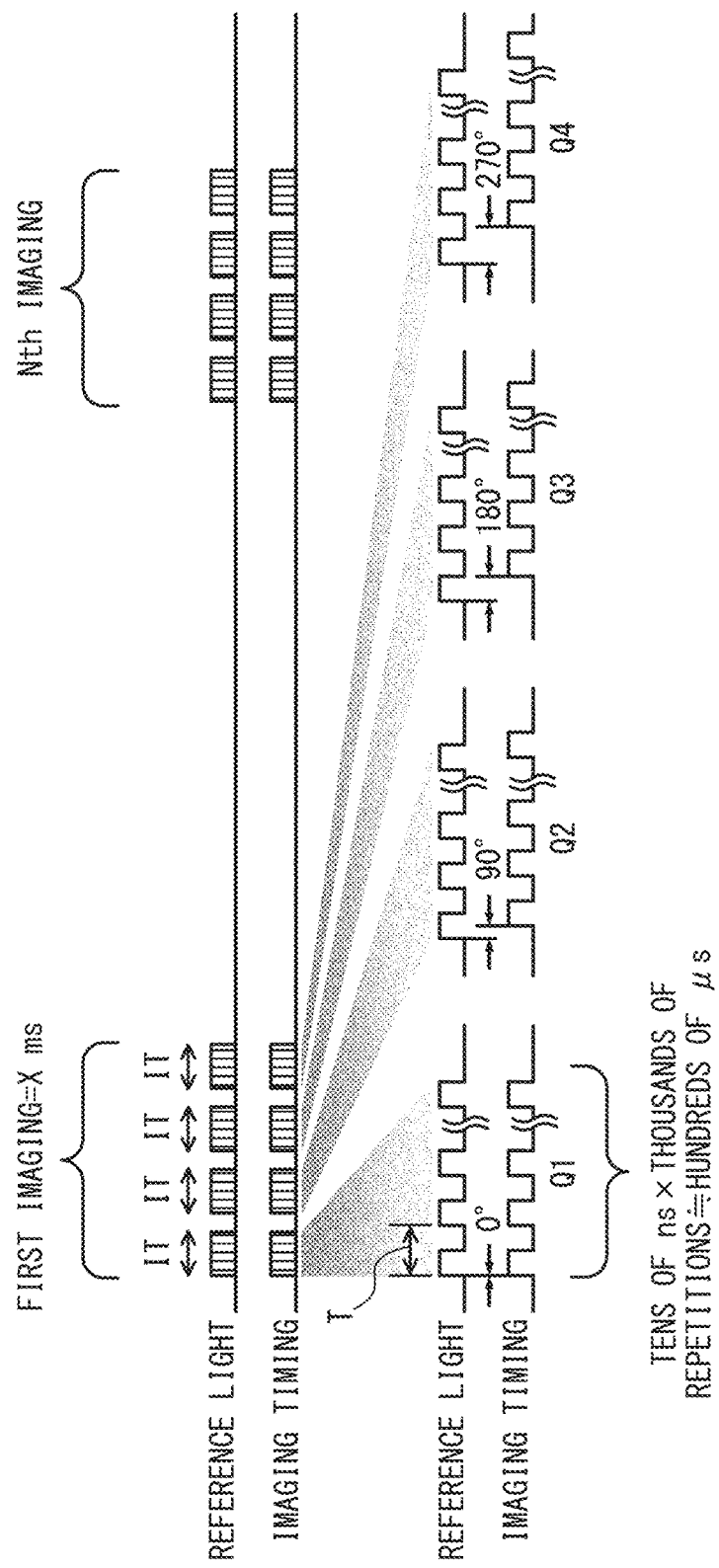
FIG. 2 is a view showing the light reception and light emission timings of a typical TOF sensor.

FIG. 2 shows the timing of light emission and light reception of the exemplary TOF sensor 10. The TOF sensor 10 emits the reference light toward the target space at predetermined light emission periods T, captures the reflected light from the target space at a plurality of imaging timings, and acquires the respective charge amounts Q1 TO Q4. The imaging timings may be timings having phases which are shifted by, for example, 0°, 90°, 180°, and 270° with respect to the reference light, but the imaging timings are not limited thereto. The TOF sensor 10 calculates the distance d of the target space and the reflected intensity s of the reference light for each pixel on the basis of, for example, the following known formula. In the formula, c is the speed of light and f is the light emission frequency of the reference light. Note that various methods for calculating the distance d and the reflected intensity s of the reference light have been proposed, and the present disclosure is limited by the calculation method.

$$d = \frac{c}{4\pi f} \cdot \arctan\left(\frac{Q2 - Q4}{Q1 - Q3}\right) \qquad 1$$

$$s = |Q1 - Q3| + |Q2 - Q4| \qquad 2$$

The TOF sensor 10 performs imaging under predetermined imaging conditions and at a predetermined imaging position. The imaging conditions include an integration time IT, the light emission period T of the reference light, the luminous intensity of the reference light, the necessary imaging repetitions N, and the like. The integration time IT corresponds to the integration time in which one charge amount Qn accumulates. Instead of the light emission period T of the reference light, the light emission frequency f (=1/T) of the reference light may be used. The luminous intensity of the reference light may be adjusted by the number of light emitting elements which emit light, or may be adjusted by a voltage value or a current value to be supplied to the light emitting elements. The necessary imaging repetitions N correspond to the number of images generated by imaging with the TOF sensor 10 necessary to combine a plurality of images (for example, averaging for each pixel). This enables, for example, the TOF sensor 10 to perform a high-speed continuous imaging operation that is independent of the normal frame rate. The N images may be combined on the TOF sensor 10 side, or may be combined on the controller 20 side (or on the host computing device 50 side, which is described later). In the former case, the image output from the TOF sensor 10 becomes a composite image. Furthermore, instead of the necessary imaging repetitions N, a time filter constant N may be used. "Time filter" refers to an image processing filter applied to a plurality of time series images, and "time filter constant N" corresponds to a number of time series images. The time filter may be applied on the TOF sensor 10 side, or it may be applied on the controller 20 side (or on the host computing device 50 side, which is described later).

Referring again to FIG. 1, the object detection system 1 includes an object detection section 21 which detects the position (including posture as necessary; the same applies hereinafter) of the object W on the basis of the image output from the TOF sensor 10, an imaging conditions calculation section 22 which calculates the imaging conditions on the basis of an image of the detected object W, and an imaging conditions changing section 23 which changes the configuration of the TOF sensor 10 to the calculated imaging conditions, and the object detection section 21 detects the position of the object W on the basis of the image output under the changed imaging conditions.

Further, the object detection system 1 may comprise an imaging position/posture calculation section 24 which calculates an imaging position (including an imaging posture if necessary, the same applies hereinafter) on the basis of the image of the detected object W, and a movement mechanism which changes a position of the TOF sensor 10 or the object W (including the posture if necessary, the same applies hereinafter) to the calculated imaging position. In this case, the object detection section 21 detects the position of the object W on the basis of the image output under at least one of the changed imaging position and the changed imaging conditions. The movement mechanism may be a robot 30 which supports the TOF sensor 10, or may be a robot 30 which supports the object W. The robot 30 changes the position of the TOF sensor 10 or the object W to the calculated imaging position.

As an alternative embodiment, the object detection system 1 may not comprise the imaging conditions calculation section 22 and imaging conditions changing section 23. In this case, the object detection system 1 comprises the imaging position/posture calculation section 24 and the movement mechanism, and the object detection section 21 detects the position of the object W on the basis of the image output at the changed imaging position.

The object detection section 21 detects the position of the object W by calculating an evaluation value representing a degree of similarity of the object W on the basis of the image output from the TOF sensor 10 and reference data of the object W or a characteristic portion of the object W stored in advance in the storage section 25 (for example, memory). The object detection section 21 may detect the position of the object W using at least one of known object detection methods, for example, a matching process for performing pixel matching, blob analysis for analyzing feature quantities (area, center of gravity, major axis, minor axis, number of corners, etc.) of pixel clusters, and object recognition for recognizing an object using a learning model constituted by machine learning or deep learning. The reference data may be a reference image, a reference model, a reference feature quantity, or learning data of the object W or the characteristic portion of the object W, and may be two-dimensional data or three-dimensional data. In any of the object detection techniques, the object detection section 21 calculates an evaluation value representing the degree of similarity of the object W using a known evaluation function, and detects a position at which the evaluation value (degree of similarity) is highest as the position of the object W. The evaluation value at this time is used for determination in the imaging conditions calculation section 22, which is described later. The evaluation function may utilize, for example, SSD (sum of squared difference), SAD (sum of absolute difference), NCC (normalized cross-correlation), ZNCC (zero-means normalized cross-correlation), or the like. The evaluation function may be a learning model constituted by machine learning, deep learning, etc. When there are a plurality of objects W or characteristic portions of the detected object W, it is preferable to assign a label such as, for example, W1, W2, W3, etc., in order of highest evaluation value and subsequently perform processing.

When the calculated evaluation value is lower than a predetermined threshold value, the imaging conditions calculation section 22 may calculate, for example, the optimal imaging conditions of the TOF sensor 10 for the object W or the characteristic portion of the object W for which the evaluation value has been detected to be highest. The imaging conditions include at least one of an integration time, a light emission period of the reference light, a luminous intensity of the reference light, a necessary imaging repetitions, etc., as described above. The imaging conditions calculation section 22 may calculate the imaging conditions on the basis of an image of the light intensity, distance, etc., of the detected object W or a specific portion of the object W, i.e., on the basis of an image of an imaging area specified as the object W or the characteristic portion of the object W in the captured image. In other words, the object detection section 21 performs calculation of the position and the evaluation value of the object W or the characteristic portion of the object W on the basis of a first image captured under the predetermined imaging conditions and at the predetermined imaging position, and when the calculated evaluation value is lower than a predetermined threshold value, the imaging conditions calculation section 22 calculates the imaging conditions. The object detection section 21 then again performs calculation of the position and evaluation value of the object W or the characteristic portion of the object W on the basis of a second image imaged under the calculated imaging conditions.

(Integration Time Calculation Method 1)

Figure 3:
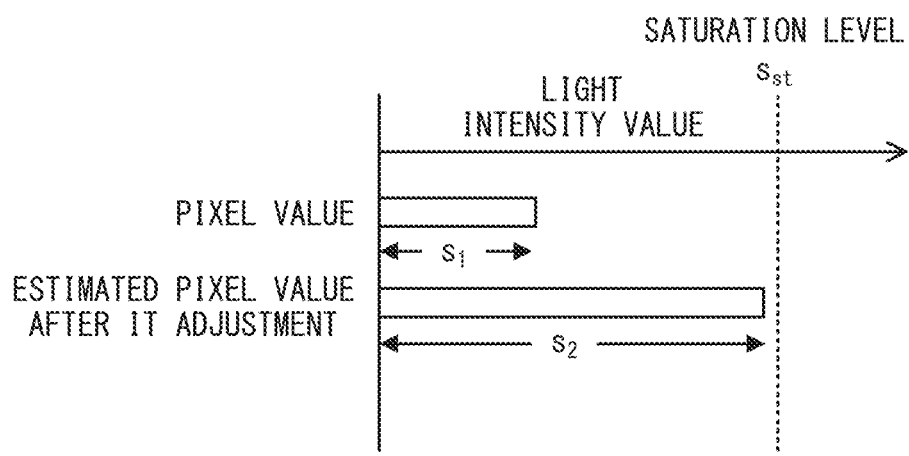
FIG. 3 is a view showing an example of an imaging conditions (integration time) calculation method.

FIG. 3 shows an example of a method for calculating the integration time. Generally, the magnitude σ of the distance measurement variation of the TOF sensor 10 can be expressed by the following formula. In the formula, s is the reflected intensity of the reference light at the object W or the specific portion of the object W, k is a stationary noise component of the TOF sensor 10 or the reflected light intensity of external light (environmental light), etc.

$$\sigma \propto \frac{\sqrt{s+k}}{s \cdot f} \qquad 3$$

As can be seen from the above formula, in order to obtain distance measurement values having little variation, it is effective to increase the reflected intensity s of the reference light. Since the integration time is equivalent to the exposure time for which the shutter of a so-called "conventional camera" is open, the reflected intensity s of the reference light can be increased by increasing the integration time. In order to increase the reflected intensity s of the reference light to such an extent that saturation does not occur, the imaging conditions calculation section 22 may calculate an integration time $IT_2$ on the basis of the ratio of the reflected intensity $s_1$ of the reference light at the detected object W or the specific portion of the object W and the occurrence level $s_{st}$ of the saturation as shown in, for example, the following formula. In the formula, $IT_1$ is the integration time before adjustment, and α is a predetermined margin. α in the formula represents a ratio to be added as a margin to the measured reflected intensity $s_1$ of the reference light, and the margin may be a constant or may be determined using a function. In this case, the imaging conditions changing section 23 changes the configuration of the TOF sensor 10 to the calculated integration time $IT_2$, and the object detection section 21 detects the position of the object W on the basis of the image output at the changed integration time $IT_2$. By adjusting the integration time $IT_2$ on the basis of the reflected intensity $s_1$ of the reference light of the object W or the specific portion of the object W in this manner, the distance measurement variation of the object W is reduced, whereby the accuracy of the position of the object W detected by the object detection section 21 is improved.

$$IT_2 = \frac{s_{st}}{s_1(1+\alpha)} \cdot IT_1 \qquad 4$$

(Integration Time Calculation Method 2)

Figure 4:
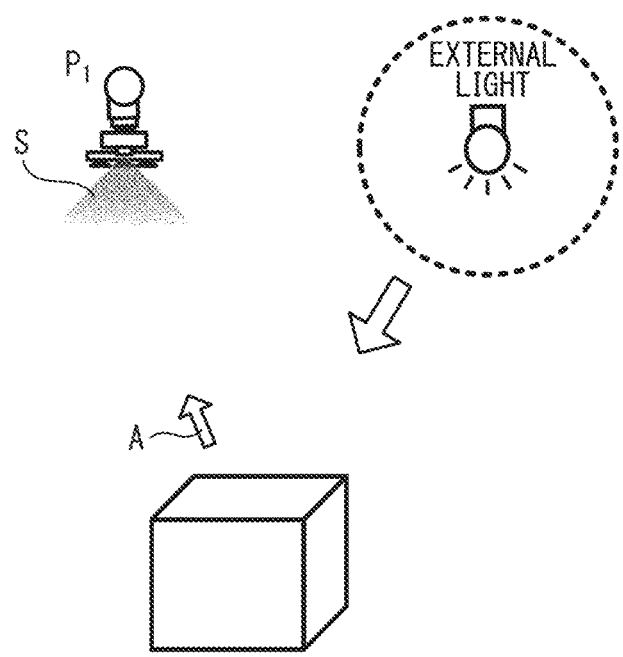
FIG. 4 is a view showing a modified example of an imaging conditions (integration time) calculation method.
Figure 5:
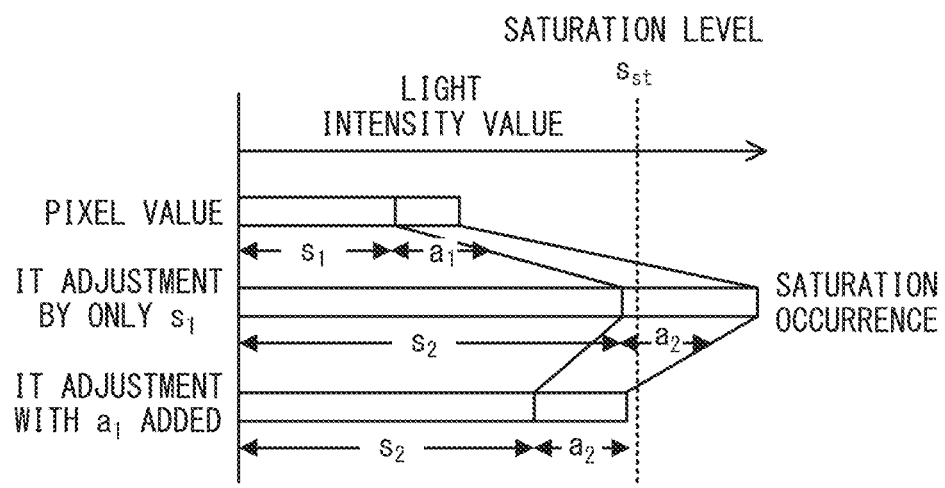
FIG. 5 is a view showing a modified example of an imaging conditions (integration time) calculation method.

FIGS. 4 and 5 show a modified example of the method for calculating the integration time. In addition to the reflected light of the reference light S, the TOF sensor 10 also receives the reflected light of the external light A present in the periphery of the measurement environment (also referred to as environmental light). As shown in FIG. 5, when the integration time IT is adjusted only by the reflected intensity $s_1$ of the reference light, saturation may occur when the reflected intensity $a_1$ of the external light is strong. Furthermore, when the integration time IT is increased, the reflected intensity $a_2$ of the received external light is also proportionally increased, whereby further saturation tends to occur. Thus, it is preferable to adjust the integration time IT in consideration of the reflected intensity $a_1$ of the external light. The reflected intensity $a_1$ of the external light may be calculated, for example, from the following formula, or may be determined from the charge amount obtained by imaging without emitting the reference light S (i.e., only the reflected light of the external light). The imaging conditions calculation section 22 calculates the integration time $IT_2$ in consideration of the reflected intensity $a_1$ of the external light as shown in, for example, the following formula. In this case, the imaging conditions changing section 23 changes the configuration of the TOF sensor 10 to the calculated integration time $IT_2$, and the object detection section 21 detects the position of the object W on the basis of the image output at the changed integration time $IT_2$. Thus, by adjusting the integration time $IT_2$ in consideration of the reflected intensity $a_1$ of the external light of the object W or specific portion of the object W, even in an environment where the external light A is strong, it is possible to reduce the distance measurement variation of the object W without the occurrence of saturation.

$$a = \frac{(Q1+Q2+Q3+Q4)-2s}{2} \qquad 5$$

$$IT_2 = \frac{s_{st}}{(s_1+a_1)(1+\alpha)} \cdot IT_1 \qquad 6$$

(Integration Time Calculation Method 3)

Figure 6:
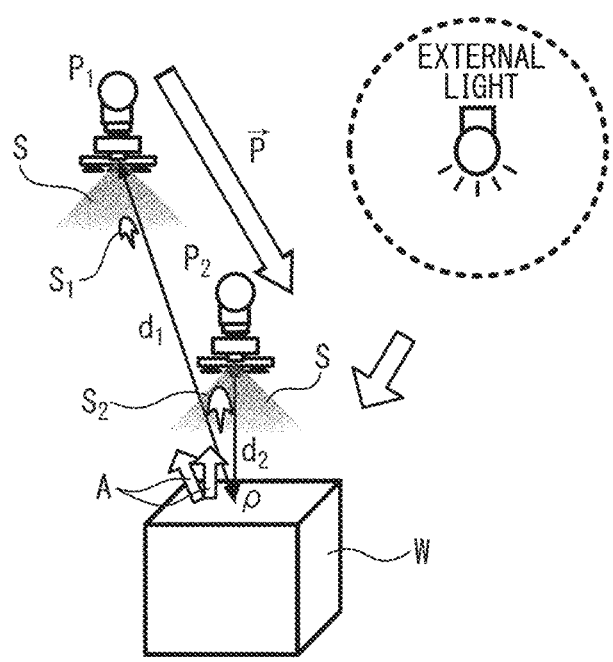
FIG. 6 is a view showing another modified example of an imaging conditions (integration time) calculation method.
Figure 7:
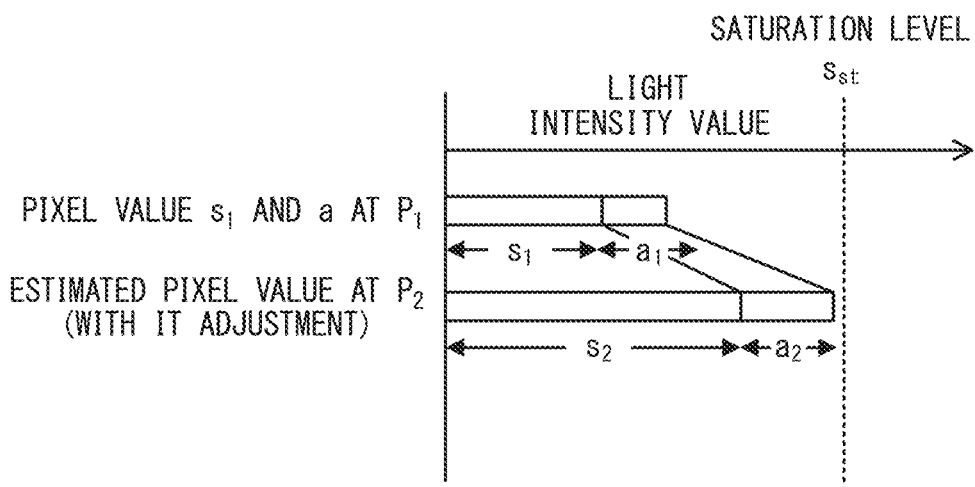
FIG. 7 is a view showing another modified example of an imaging conditions (integration time) calculation method.

FIGS. 6 and 7 show another modified example of the method for calculating the integration time. When there is a change in the imaging position, the integration time may be calculated by taking into consideration the distance $d_1$, $d_2$ to the object W or the specific portion of the object W. In general, the reflected intensity s of the reference light S is inversely proportional to the square of the distance d to the object W or the specific portion of the object W, as shown in the following formula. Thus, the reflected intensity $s_2$ of the reflected light $S_2$ of the reference light in the imaging position $P_2$ in the vicinity to the object W increases in accordance with the square of the ratio of the distance $d_1$ to the object W or specific portion of the object W at the imaging position $P_1$ and the distance $d_2$ to the object W or the specific portion of the object W at the imaging position $P_2$ as compared with the reflected intensity $s_1$ of the reflected light $S_1$ of the reference light at the imaging position $P_1$. Thus, in order to increase the reflected intensity $s_2$ of the reflected light $S_2$ of the reference light to such an extent that saturation does not occur when the TOF sensor 10 approaches the object W or the specific portion of the object W, the imaging conditions calculation section 22 may calculate the integration time $IT_2$ in consideration of the ratio of the distance $d_1$ to the object W or the specific portion of the object W at the imaging position prior to changing and the distance $d_2$ to the object W or the specific portion of the object W at the changed imaging position as shown in, for example, the following formula. Note that the distance $d_2$ can be calculated from a motion vector P of the distance $d_1$ to the object W calculated from the image captured at imaging position $P_1$ and the subsequent imaging position $P_2$. Furthermore, for example, when the object W is a dark object and the imaging conditions are adjusted after the imaging position has first been changed, the distance measurement value of the object W output from the TOF sensor 10 after moving to the imaging position $P_2$ may be used as the distance $d_2$. The imaging conditions changing section 23 changes the configuration of the TOF sensor 10 to the calculated integration time $IT_2$ in this manner, and the object detection section 21 detects the position of the object W on the basis of the image output at the changed integration time $IT_2$. Thus, by adjusting the integration time $IT_2$ in consideration of the distance $d_1$, $d_2$ to the object W or the specific portion of the object W, distance measurement variation of the object W can be reduced without the occurrence of saturation even when the imaging position is changed.

$$s \propto \frac{1}{d^2} \qquad 7$$

$$IT_2 = \frac{s_{st}}{\left(s_1 \cdot \left(\frac{d_1}{d_2}\right)^2 + a_1\right)(1 + \alpha)} \cdot IT_1 \qquad 8$$

(Luminous Intensity Calculation Method)

Referring again to FIG. 1, the imaging conditions calculation section 22 may calculate the luminous intensity of the reference light using the same principal as the aforementioned integration time calculation methods 1 to 3. In general, the amount of received light of the reflected light of the external light also increases or decreases proportionally by increasing or decreasing the integration time, but the amount of received light of the reflected light of the external light does not change by increasing or decreasing the luminous intensity. For example, the following formula is a calculation formula which takes into consideration the reflected intensity $a_1$ of the external light and is a calculation formula of the case in which the imaging position is further changed, and corresponds to formula 8. The case in which the reflected intensity of external light is not taken into consideration is defined as $a_1=0$ and the case in which there is no change in the imaging position is defined as $d_1=d_2$. In the formula, $LI_1$ is the luminous intensity prior to adjustment, and in this case, the imaging conditions changing section 23 changes the configuration of the TOF sensor 10 to the calculated luminous intensity $LI_2$, and the object detection section 21 detects the position of the object W on the basis of the image output at the changed luminous intensity $LI_2$. The luminous intensity of the reference light may be adjusted in accordance with the number of light emitting elements which emit light, as described above, or may be adjusted by a voltage value or a current value to be supplied to the light emitting elements. By adjusting the luminous intensity on the basis of the light intensity, distance, etc., of the object W or the specific portion of the object W, as described above, variations in distance measurement of the object W can be further reduced.

$$LI_2 = \frac{s_{st} - a_1}{s_1(1 + \alpha)} \cdot \left(\frac{d_2}{d_1}\right)^2 \cdot LI_1 \qquad 9$$

(Light Emission Period Calculation Method)

Figure 8:
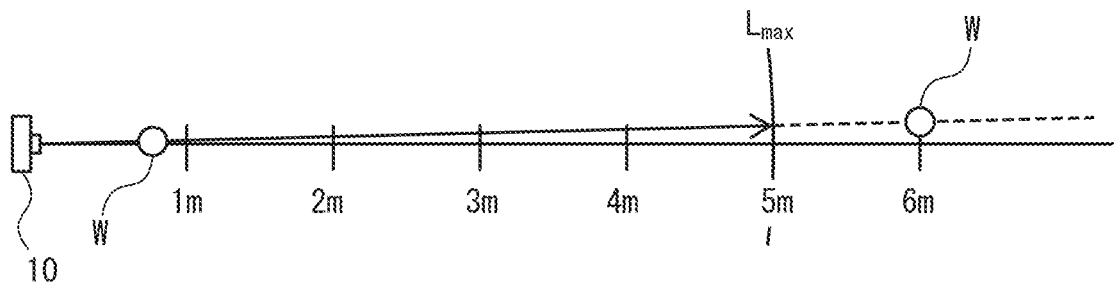
FIG. 8 is a view showing an example of an occurrence of a distance measurement error due to aliasing and a method for calculating appropriate light emission frequency.

As shown in formula 3, in general, the magnitude σ of the distance measurement variation of the TOF sensor 10 can be reduced by increasing the light emission frequency f (=1/T) of the reference light. Thus, the imaging conditions calculation section 22 may further calculate the light emission frequency f (light emission period T; the same applies hereinafter) of the reference light on the basis of the distance d to the detected object W or the specific portion of the object W. However, care must be taken because when the light emission frequency f is simply increased, the distance measurement error due to the aliasing occurs. FIG. 8 shows an example of the occurrence of distance measurement error due to the aliasing and a method for calculating suitable light emission frequency f. For example, when the light emission frequency f of the reference light is 30 MHz (light emission period T is 33 nm), the distance measuring range $L_{max}$ capable of correct distance measurement of the TOF sensor 10, from the following formula, is 5 m. At this time, for example, if the actual distance d to the detected object W or the specific portion of the object W is 6 m, a distance measurement error will occur due to aliasing (the distance is erroneously measured as 1 m). Thus, imaging is performed at a low light emission frequency at a level at which the distance to the object W the specific portion of the object W is unknown, and when the object W or the specific portion of the object W is detected and the distance thereof is identified, an appropriate light emission frequency at which aliasing does not occur may be calculated. For example, when the distance d to the object W or a specific portion of the object W is 80 cm in low light emission frequency imaging, in order to increase the light emission frequency f to such an extent that a distance measurement error due to aliasing does not occur, the imaging conditions calculation section 22 calculates the light emission frequency f=150 MHz (light emission period T=6 nm) so that the distance (for example, 1 m) obtained by adding a predetermined margin β (for example, 20 cm) to the detected distance d becomes the distance measurement range $L_{max}$ of the TOF sensor 10, as shown in, for example, the following formula. In this case, the imaging conditions changing section 23 changes the configuration of the TOF sensor 10 to the calculated light emission frequency f, and the object detection section 21 detects the position of the object W on the basis of the image output at the changed light emission frequency f. Thus, by increasing the light emission frequency f on the basis of the distance d to the object W or the specific portion of the object W, it becomes possible to further reduce the distance measurement variation of the object W without the occurrence of distance measurement errors due to aliasing.

$$L_{max} = \frac{c}{2 \cdot f} \qquad 10$$

$$T = \frac{2(d + \beta)}{c} \qquad 11$$

The distance measurement variation of the TOF sensor 10 shown in formula 3 is primarily due to shot noise, and the distance measurement variation exhibits a distribution which can be regarded as a normal distribution. Thus, a distance measurement value having a reduced distance measurement variation is obtained by capturing a plurality of images from the same imaging position and performing processing such as averaging. Referring again to FIG. 1, when the evaluation value is still lower than the predetermined threshold value, the imaging conditions calculation section 22 may increase the necessary imaging repetitions (or time filter constant). In this case, the imaging conditions changing section 23 changes the configuration of the TOF sensor 10 to the calculated necessary imaging repetitions (or time filter constant), the object detection section 21 detects the position of the object W on the basis of the composite image of the plurality of images which have been captured the changed necessary imaging repetitions (or by the time filter constant). By increasing the necessary imaging repetitions (or time filter constant) in this manner, it is possible to further reduce the distance measurement variation of the object W.

When the calculated evaluation value is lower than a predetermined threshold value, the imaging position/posture calculation section 24 may calculate at least the imaging position. In this case, the robot 30, which is the movement mechanism, changes the position of the TOF sensor 10 or the object W to the calculated imaging position, and the object detection section 21 detects the position of the object W on the basis of the image output at the changed imaging position.

Figure 9:
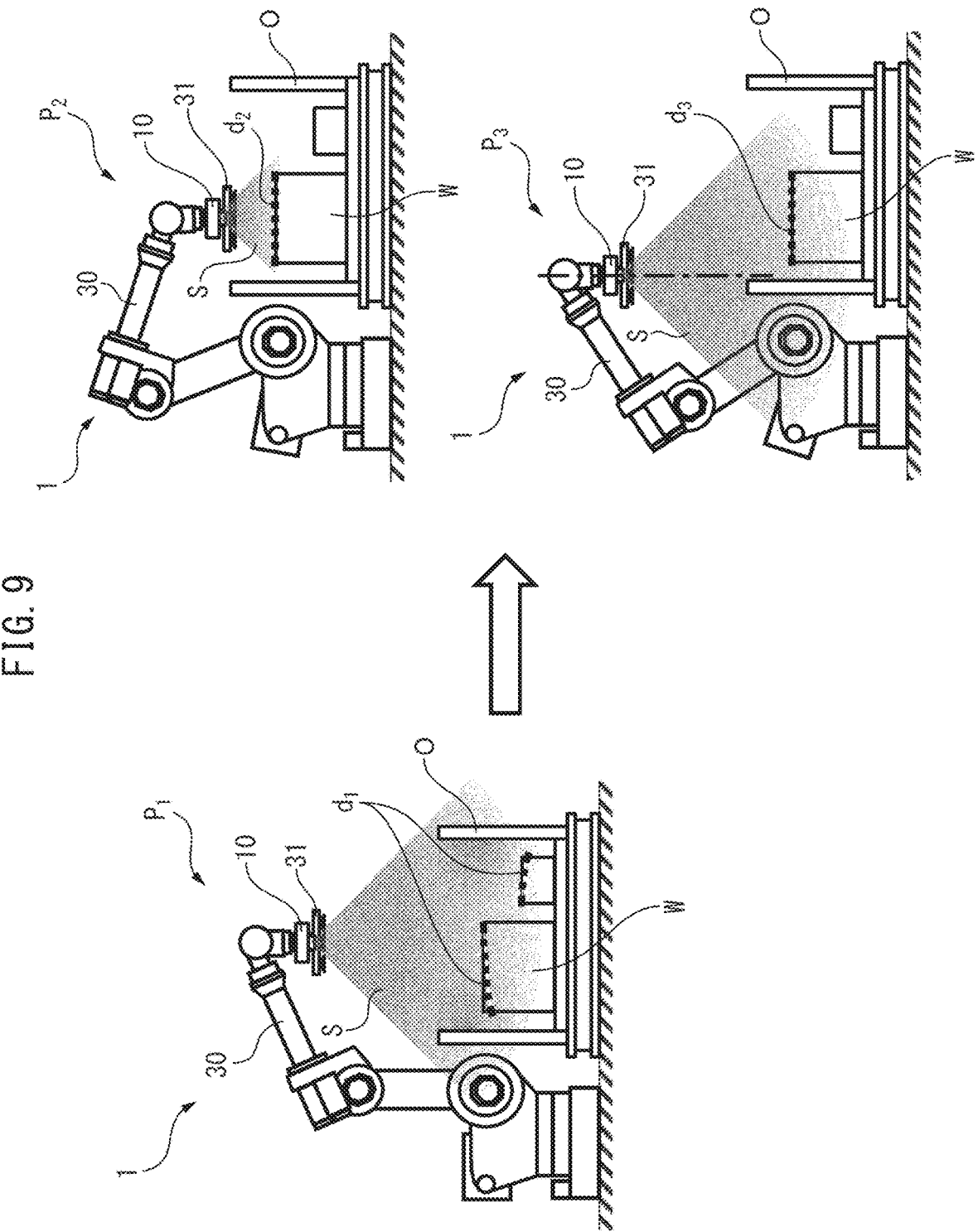
FIG. 9 is a view showing an example of an imaging position calculation method.

FIG. 9 shows an example of imaging position calculation. As shown on the left side of FIG. 9, since the object W is relatively far from the TOF sensor 10 in the imaging position $P_1$, the number of pixels capturing the object W (i.e., the number of distance measurement points) is also small, and the reflected intensity of the reference light S of the object W is weak, the distance measurement variation tends to be relatively large. Furthermore, since the irradiation range of the reference light S of a general TOF sensor is designed to be substantially equivalent to the imaging range, in the imaging position $P_1$, the object W is irradiated with the reference light S reflected by the strongly-reflective object O in the vicinity of the object W, so that a phenomenon referred to as "multi-path" in which the distance measurement value $d_1$ of the object W is shifted backward as indicated by, for example, the dashed line in the drawing, occurs. Thus, to improve the evaluation value and detect correct positions in the detection of the object W, the imaging position/posture calculation section 24 may calculate an imaging position in which the number of pixels for imaging the object W is increased, an imaging position in which the reflected intensity of the reference light S is increased, or an imaging position in which the influence of the multi-path is reduced.

(Imaging Position Calculation Method 1)

Since general TOF sensors (or FA cameras) lack a zoom function, the imaging position/posture calculation section 24 may calculate an imaging position $P_2$ in which it closely approaches the detected object W or the characteristic portion of the object W so as to capture a larger image thereof in the image. FIG. 10 shows an imaging position $P_2$ in which larger imaging in the image can be carried out by approaching the object W. Thus, an increase in the number of distance measurement points of the object W or the characteristic portion of the object W and a decrease in distance measurement variation due to an increase in the reflected intensity of the reference light S of the object W can be expected. Furthermore, since the strongly-reflective object O does not fall within the angle of view of the TOF sensor 10 (that is, the irradiation range of the reference light S) in the imaging position $P_2$, the object W is not impacted by the influence of multi-path due to the strongly-reflective object O and the phenomenon in which the distance measurement value $d_2$ of the object W is shifted backward does not occur. By adjusting the object W or the characteristic portion of the object W to the imaging position $P_2$ so as to be captured larger in the image, the position of the object W can be more accurately detected.

Figure 11A:
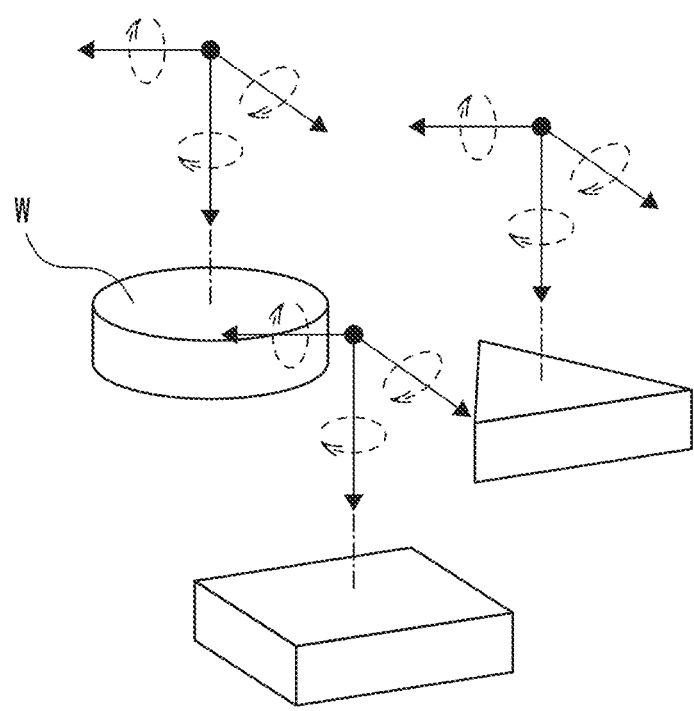
FIG. 11A is a perspective view showing an example of a preset imaging position and imaging posture relative to an object.
Figure 11B:
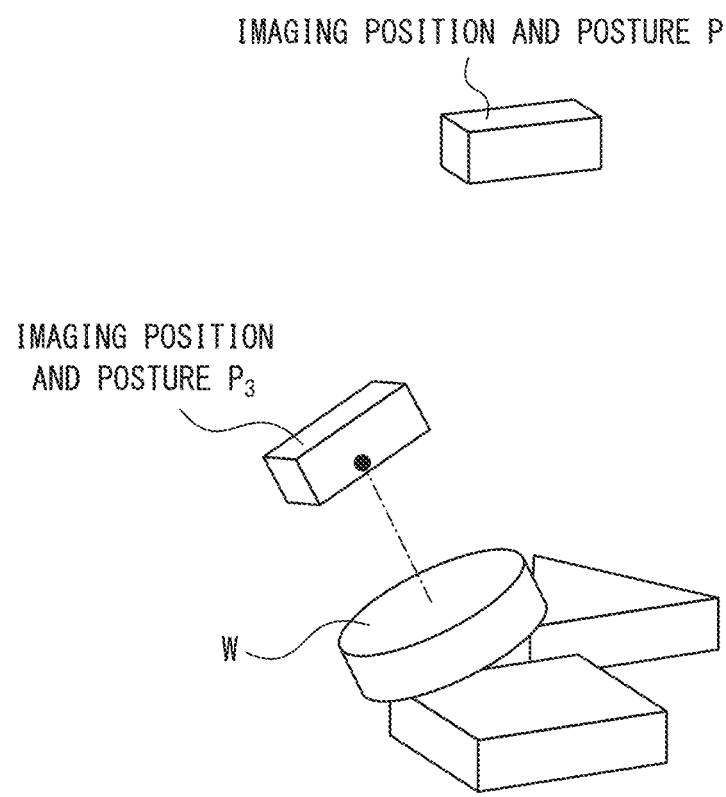
FIG. 11B is a perspective view showing an example of a preset imaging position and imaging posture relative to an object.

The imaging position/posture calculation section 24 may calculate at least one of the imaging position and the imaging posture so that the detected object W or the characteristic portion of the object W is imaged in at least one of an imaging position and an imaging posture set in advance with respect to reference data thereof. FIG. 11A shows an example of the imaging position and the imaging posture set in advance with respect to the object W. In general, these are set to an imaging position and an imaging posture which are suitable for position detection of the object. Furthermore, if as reference image of the object W is used as the reference data, the imaging position and imaging posture when this image is acquired are commonly used. There may be a plurality of imaging positions and imaging postures with respect to the object W, and in this case, a suitable imaging position and imaging posture may be selected in accordance with the state of the detected object. FIG. 11B shows an imaging position and posture $P_3$ which is set in advance for the object W. Since the object W is relatively distant and tilted in advance in the imaging position and posture $P_1$, the evaluation value is likely to be low. When the evaluation value becomes low, as described above, the imaging position/posture calculation section 24 may calculate a suitable imaging position and posture on the basis of the detected position of the object W so as to achieve the imaging position and posture $P_3$ set in advance with respect to the reference data of the object W. As a result of such an operation, more suitable position detection of the object W is possible.

(Imaging Position Calculation Method 2)

Figure 12A:
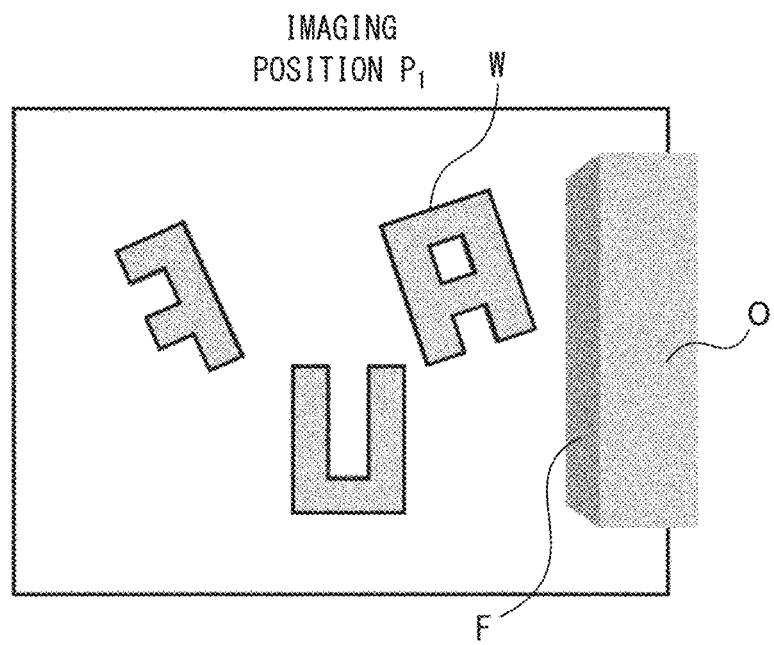
FIG. 12A is a view showing an imaging position in which the surface of an object which exerts multi-path influence can be seen.
Figure 12B:
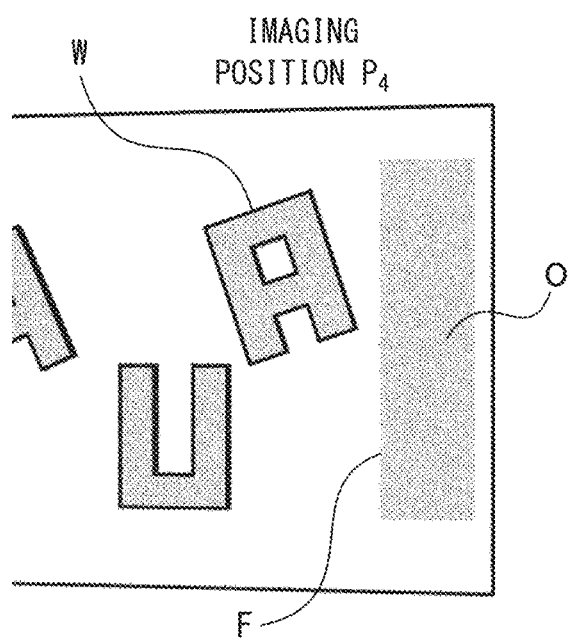
FIG. 12B is a view showing an imaging position in which the surface of an object which exerts multi-path influence cannot be seen.

As shown on the lower right of FIG. 9, the imaging position/posture calculation section 24 may specify a surface of the strongly-reflective object O which exerts multi-path influence and calculate an imaging position $P_4$ at which the surface of the object O is not irradiated with the reference light of the TOF sensor 10. In general TOF sensors, since the reference light irradiation portion and the reflected light receiving portion are integrated and can be considered to be in the same position, the imaging position at which the surface of the object O is not visible is the position in which the surface of the object O is not irradiated with the reference light, so that multi-path influence from the surface of the object O does not occur. FIG. 12A shows an image position $P_1$ in which the surface F of the object O which exerts multi-path is visible, and FIG. 12B shows an image position $P_4$ in which the surface F of the object O which exerts multi-path cannot be seen. The imaging position/posture calculation section 24 may specify the surface of the strongly-reflective object O present in the vicinity of the detected object W or the characteristic portion of the object W from within the image, calculate the position and posture of the specified surface F, and calculate a point on the extended surface of the surface F as an imaging position $P_4$. Depending on the arrangement state of the object and the strongly-reflective object, the TOF sensor 10 may be in an imaging position in which the surface of the strongly-reflective object is not visible by bringing the TOF sensor 10 close to the object W, as shown on the upper right of FIG. 9 and the right of FIG. 10. Thus, by adjusting to the image position $P_4$ in which the surface of the strongly-reflective object O exerting multi-path influence cannot be seen, the position of the object W can be accurately detected.

Figure 13A:
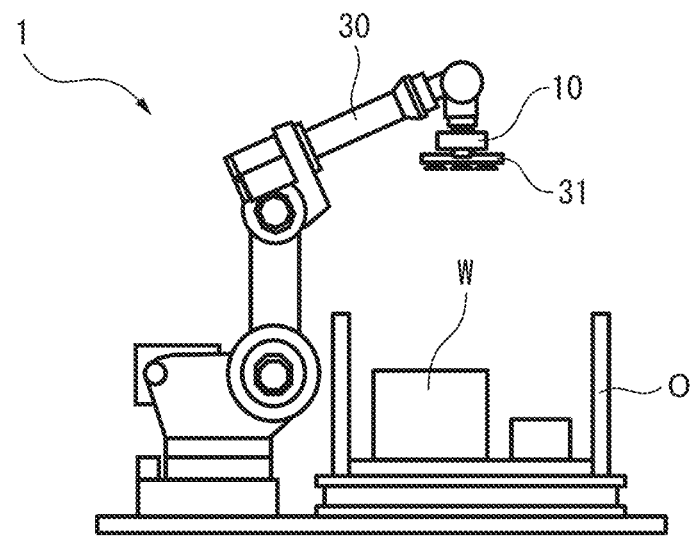
FIG. 13A is a view showing an example of a movement mechanism.
Figure 13B:
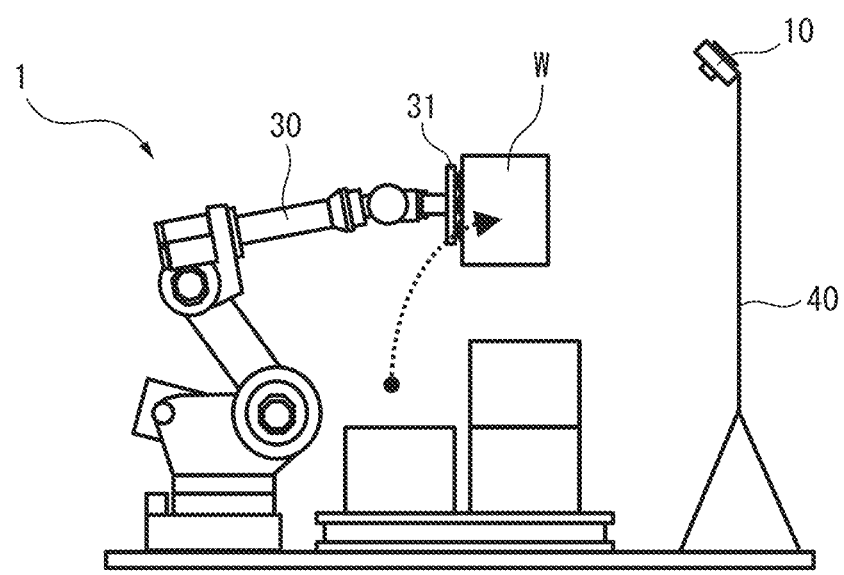
FIG. 13B is a view showing a modified example of a movement mechanism.

FIG. 13A shows an example of a movement mechanism, FIG. 13B shows a modified example of the movement mechanism. The movement mechanism may be a robot 30 which supports the TOF sensor 10, as shown in FIG. 13A, or may be a robot which supports the object W, as shown in FIG. 13B. In FIG. 13A, for example, the TOF sensor 10 is attached to the tip of the robot arm, and the robot 30 which supports the TOF sensor 10 changes the position of the TOF sensor 10 to the calculated imaging position so that the position of the object W can be accurately detected. In FIG. 13B, the robot 30 which supports the object W on the basis of approximate position information of the object W detects the correct position, posture, size, etc., of the object in a supported state with the TOF sensor 10 at a predetermined fixed point. The robot 30 which supports the object W changes the position of the object W to the calculated imaging position so that the position, posture, size, etc., of the supported object O can be more accurately detected. By configuring the movement mechanism as the robot 30 in this manner, it is possible to achieve both the picking and positioning operations originally performed by the robot 30 and the object detection operation.

Figure 14:
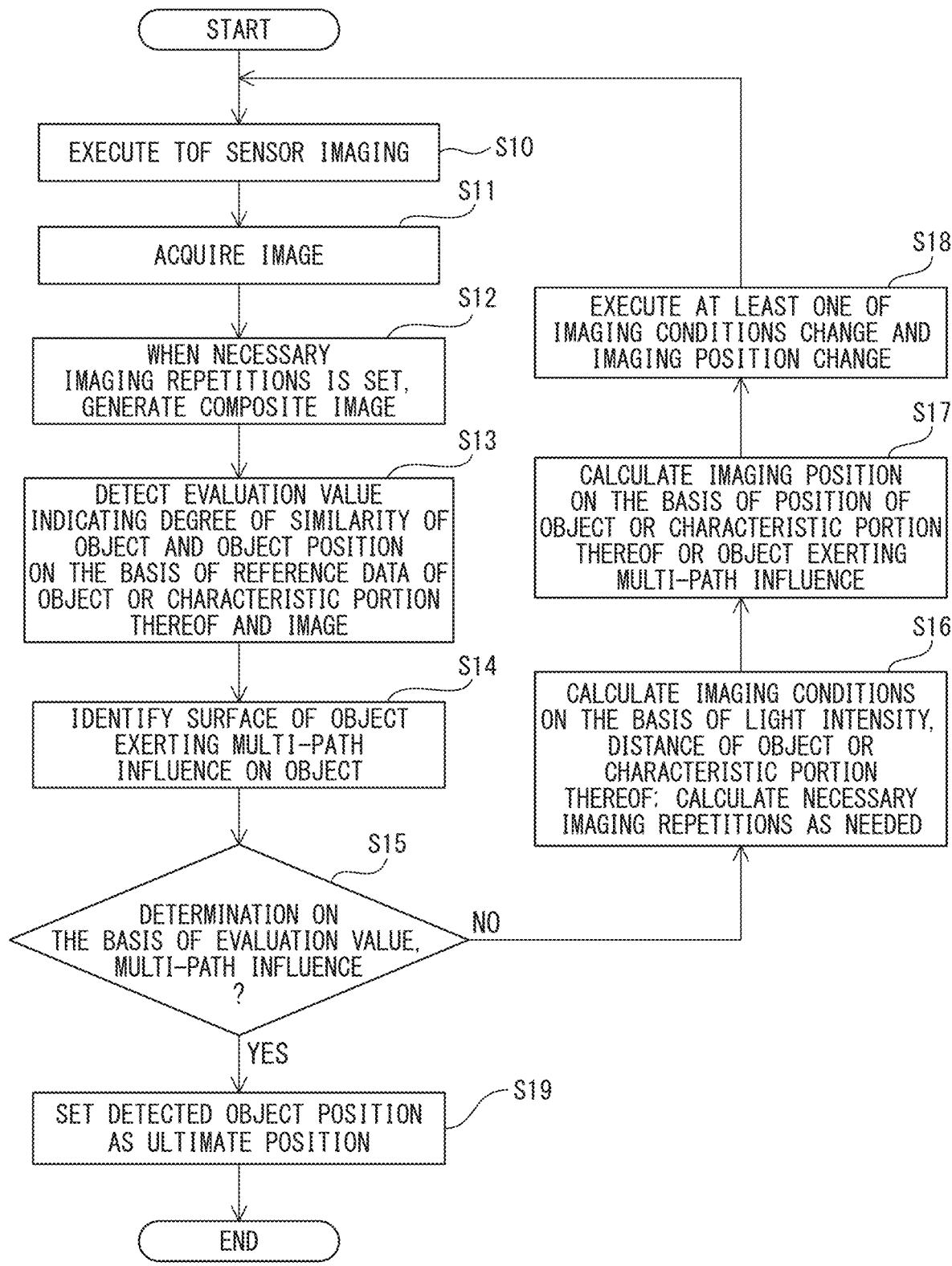
FIG. 14 is a flowchart illustrating the operation of an object detection system according to an embodiment.

FIG. 14 shows the operation of the object detection system 1 of the present embodiment. When the object detection system 1 begins the detection process, in step S10, imaging of the TOF sensor under the predetermined imaging conditions and at the predetermined imaging position is executed. In step S11, the image output from the TOF sensor is acquired. When the necessary imaging repetitions (or time filter constant) is set, a composite image may be generated in step S12. The composite image may be generated on the TOF sensor side or may be generated on the controller side (or on the host computing device side, which is described later).

In step S13, the position of the object is detected by calculating an evaluation value representing the degree of similarity of the object on the basis of the image output from the TOF sensor and the reference data of the object or the characteristic portion of the object stored in advance. When there are a plurality of objects detected at this time, labels, for example, W1, W2, W3, etc., may be assigned in order of highest evaluation value, and the subsequent processing may be performed. Though step S14 is not an indispensable step, it is preferable to identify surfaces of the object which may exert a multi-path influence on the object.

In step S15, it is determined whether or not the calculated evaluation value is lower than a predetermined threshold value. Further, it may be determined whether or not the surface of the object exerting multi-path influence has been identified. In step S15, when the evaluation value is lower than the predetermined threshold value or when the surface of the object exerting multi-path influence has been identified (NO in step S15), the process proceeds to step S16. In step S16, the imaging conditions are calculated based on the light intensity, the distance, etc., at the object or the characteristic portion of the object. When the evaluation value is not improved, the necessary imaging repetitions (or the time filter constant) may be calculated as necessary.

In step S17, the imaging position is calculated based on the position (and posture, if necessary) of the object or the characteristic portion of the object and the surface of the object exerting multi-path influence. At least one of steps S16 and S17 may be performed. In step S18, at least one of changing of the imaging conditions and changing of the imaging position is performed. Thereafter, the process returns to step S10. In step S13, the position of the object is again detected by calculating the evaluation value again on the basis of the image output under at least one of the changed imaging conditions and the changed imaging position.

In step S15, when the evaluation value is again lower than the predetermined threshold value or when a surface of the object exerting multi-path influence is again identified (NO in step S15), step S16 to step S14 are repeated. Note that a loop repetition limit may be provided so that when the loop has repeated a predetermined number of times or more, a notification may be issued as such, and the detection process may end. In step S15, when the evaluation value is greater than the predetermined threshold value and a surface of the object which exerts multi-path influence is not identified (YES in step S15), in step S19, the detection process ends using the detected position of the object W as the ultimate position. Though not illustrated, the operation of the robot is corrected based on the ultimate position of the object W.

Figure 15:
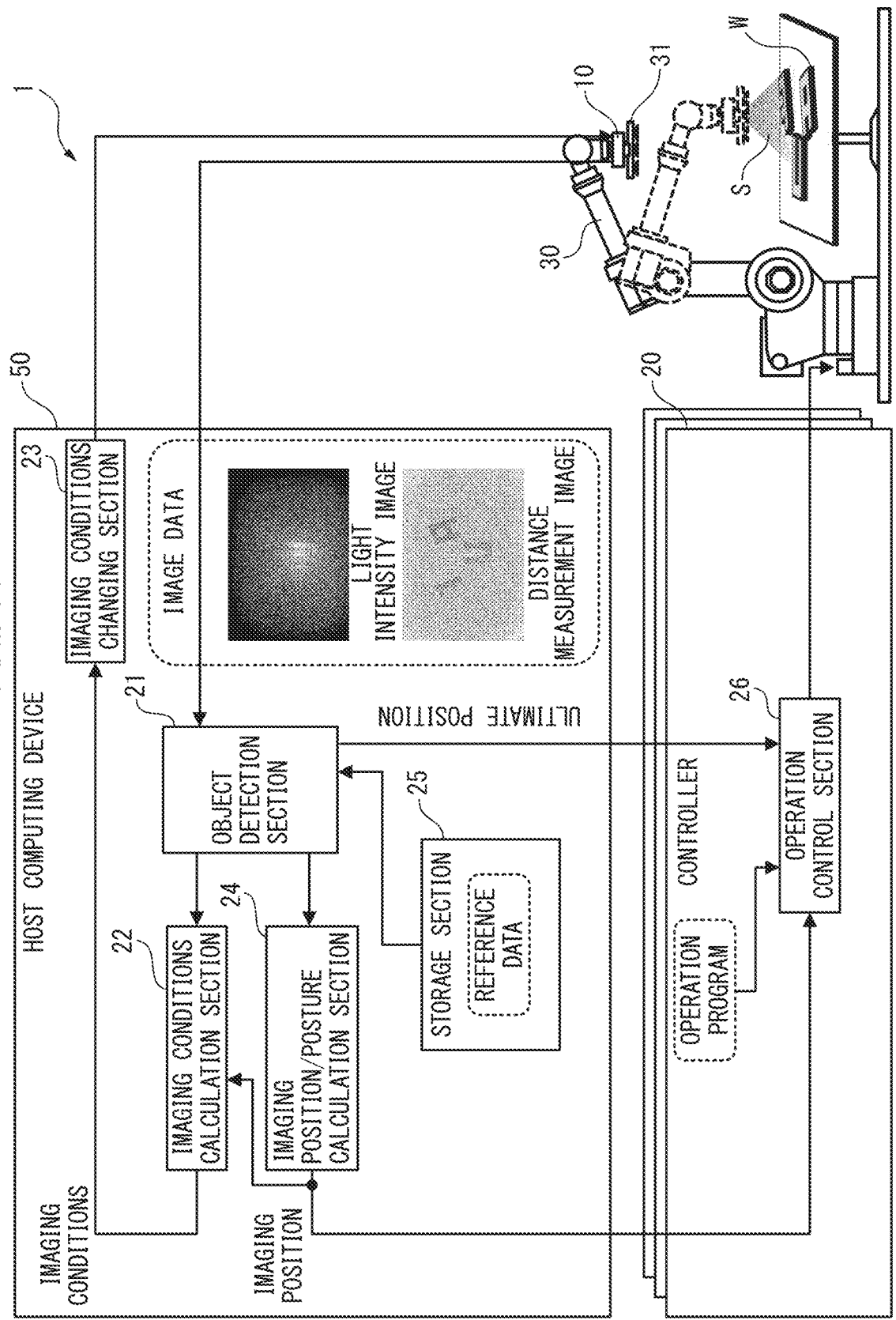
FIG. 15 is a block diagram showing a modified example of the structure of an object detection system.

FIG. 15 shows a modified example of the configuration of the object detection system 1. The object detection system 1 of this example may comprise a plurality of TOF sensors 10, one host computing device 50 wired or wirelessly connected to the plurality of TOF sensors 10, a plurality of controllers 20 which receive commands from the host computing device 50, a plurality of robots 30, and a plurality of tools 31 which are respectively controlled by the plurality of controllers 20. The host computing device 50, like the controller 20, may be a classical computer or a quantum computer. By incorporating the primary components of the object detection system 1 into the host computing device 50 in this manner, the processing performance, maintainability, etc., of the object detection system 1 can be improved.

According to the embodiments described above, by changing at least one of the imaging conditions and the imaging position on the basis of the image of the object W detected from the image of the TOF sensor 10, the position of the object W can be accurately detected.

The program executed by the processor described above may be recorded and provided on a computer readable non-transitory recording medium, such as a CD-ROM, or the like.

Though various embodiments have been described, it should be noted that the present invention is not limited to the embodiments described above, but various changes may be made within the scope described in the following claims.

The invention claimed is:

1. An object detection system, comprising:
   a TOF sensor which outputs an image of a target space on the basis of a phase difference between reference light emitted toward the target space and reflected light from the target space,
   an object detection section which detects a position of an object present in the target space on the basis of the output image,
   an imaging conditions calculation section which calculates imaging conditions including at least one of an integration time and a light emission period of the TOF sensor on the basis of an image of the detected object, and
   an imaging conditions changing section which changes a configuration of the TOF sensor to the calculated imaging conditions, wherein
   the object detection section detects a position of the object on the basis of the image output under the changed imaging conditions.

2. The object detection system according to claim 1, wherein the imaging conditions calculation section calculates the light emission period on the basis of a distance to the detected object or the specific portion of the object.

3. The object detection system according to claim 1, wherein the imaging conditions further include a necessary imaging repetition count of the TOF sensor, and the image is a composite image in which a plurality of images captured at the necessary imaging repetition count are combined.

4. The object detection system according to claim 1, wherein the imaging conditions further include a luminous intensity of the TOF sensor, and the imaging conditions calculation section calculates the luminous intensity on the basis of an image of the detected object.

5. The object detection system according to claim 1, wherein the imaging conditions calculation section calculates the integration time on the basis of a reflected intensity of the reference light of the detected object or a specific portion of the object.

6. The object detection system according to claim 5, wherein the imaging conditions calculation section calculates the integration time in consideration of a reflected intensity of external light of the detected object or the specific portion of the object.

7. The object detection system according to claim 5, wherein the imaging conditions calculation section calculates the integration time in consideration of a distance to the object or the specific portion of the object.

8. The object detection system according to claim 1, further comprising an imaging position/posture calculation section which calculates at least an imaging position on the basis of the image of the detected object, and a movement mechanism which changes at least a position of the TOF sensor or the object to the calculated imaging position, wherein the object detection section detects the position of the object on the basis of the image output under at least one of the changed imaging position and the changed imaging conditions.

9. The object detection system according to claim 8, wherein the imaging position/posture calculation section calculates the imaging position so that the detected object or a characteristic portion of the object is captured larger in the image.

10. The object detection system according to claim 8, wherein the imaging position/posture calculation section specifies a surface of an object which exerts multi-path influence on the detected object, and calculates the imaging position so that the reference light emitted by the TOF sensor is not emitted onto the surface of the object.

11. The object detection system according to claim 8, wherein the movement mechanism is a robot which supports the TOF sensor or a robot which supports the object.

12. The object detection system according to claim 8, wherein the object detection section further calculates an evaluation value representing a degree of similarity of the object on the basis of the output image and pre-stored reference data of the object or a characteristic portion of the object, and when the calculated evaluation value is less than a predetermined threshold, the imaging conditions calculation section calculates the imaging conditions or the imaging position/posture calculation section calculates the imaging position.

13. The object detection system according to claim 12, wherein the imaging position/posture calculation section calculates at least one of the imaging position and the imaging posture so that the detected object or the characteristic portion of the object is imaged in at least one of a preset imaging position and imaging posture with respect to reference data of the object or the characteristic portion of the object.

14. An object detection system, comprising:
a TOF sensor which outputs an image of a target space on the basis of a phase difference between reference light emitted toward the target space and reflected light from the target space,
an object detection section which detects a position of an object present in the target space on the basis of the output image,
an imaging position/posture calculation section which calculates at least an imaging position of the TOF sensor on the basis of the image of the detected object, and
a movement mechanism which changes at least a position of the TOF sensor or the object to the calculated imaging position, wherein
the object detection section detects a position of the object on the basis of the image output at the changed imaging position.

* * * * *